United States Patent [19]

Hollins

[11] Patent Number: 4,911,283
[45] Date of Patent: Mar. 27, 1990

[54] SINGLE LOG FEEDER

[76] Inventor: Bryant C. Hollins, P.O. Box 790, 100 Mile House, B.C. V0K 2EO, Canada

[21] Appl. No.: 256,044

[22] Filed: Oct. 11, 1988

[30] Foreign Application Priority Data

Oct. 30, 1987 [CA] Canada ................................ 550713

[51] Int. Cl.⁴ .......................................... B65G 37/00
[52] U.S. Cl. ................................ 198/463.5; 414/746.4
[58] Field of Search ........................ 198/463.5, 468.7; 414/746.4

[56] References Cited

U.S. PATENT DOCUMENTS

| | | |
|---|---|---|
| 2,751,781 | 6/1956 | McConnell . |
| 3,112,021 | 11/1961 | Forsberg . |
| 3,584,726 | 6/1971 | Hartzell . |
| 4,624,361 | 11/1986 | Hollins ............................ 198/463.5 |

FOREIGN PATENT DOCUMENTS

| | | |
|---|---|---|
| 0789368 | 7/1968 | Canada . |
| 0920544 | 2/1973 | Canada . |
| 0922659 | 3/1973 | Canada . |
| 0980820 | 12/1975 | Canada . |
| 989427 | 5/1976 | Canada . |
| 1048562 | 2/1979 | Canada . |
| 1114408 | 12/1981 | Canada . |

*Primary Examiner*—Robert J. Spar
*Assistant Examiner*—Lyle Kimms
*Attorney, Agent, or Firm*—Willian, Brinks, Olds, Hofer, Gilson & Lione

[57] ABSTRACT

An apparatus which is capable of sorting logs of varying diameter and feeding them one at a time to a log processing apparatus. A cylinder handling apparatus comprising: (a) a device for receiving and holding a plurality of cylindrical objects of varying diameter and length parallel to and abutting one another in a row; and (b) a device for separating and raising the foremost cylindrical object from the secondarily disposed cylindrical objects in a row and dispensing the foremost cylindrical object from the apparatus, and raising at least one of the secondarily disposed cylindrical objects above the surface of the receiving and holding device.

12 Claims, 4 Drawing Sheets

SINGLE LOG FEEDER

FIELD OF THE INVENTION

This invention is directed to an apparatus for single feeding elongated cylindrical objects to suitable processing apparatus. In a specific application, this invention is directed to an apparatus which is capable of sorting logs of varying diameter and feeding them one at a time to a log processing apparatus.

BACKGROUND OF THE INVENTION

This invention is an important improvement that is suitable for use in a single log feeder which is disclosed and claimed in U.S. Pat. No. 4,624,361, granted Nov. 25, 1986, Bryant C. Hollins, assignee Exco Industries Ltd. That patent discloses and protects a basic single log feeder which is capable of sorting logs of varying diameter and feeding them one at a time to a log processing apparatus.

It has been a longstanding problem in the elongated cylinder handling industry to efficiently take a long cylindrical object from a random group of such cylindrical objects of various sizes and orientations, align the single cylindrical object in a predetermined direction and direct it to a cylinder handling apparatus. One of the industries in which this problem arises is the log handling industry. Numerous machines and processes have been designed over the years in an effort to develop an apparatus and a method of efficiently handling a wide range of straight and crooked logs of varying diameters and lengths mixed butts and ends, and aligning them one at a time in a generally parallel pattern and feeding them without interruption to a log processing machine such as a debarker or a chip and saw apparatus.

The applicant is aware of the following patents which disclose various devices for processing logs.

| Canadian Patent No. | Issue Date | Inventor |
| --- | --- | --- |
| 789,368 | July 9, 1968 | Ahlstedt |
| 920,544 | February 6, 1973 | Lindblom |
| 922,659 | March 13, 1973 | Rysti |
| 980,820 | December 30, 1975 | Hartzell and Gunnerman |
| 989,427 | May 18, 1976 | Valo |
| 1,048,562 | February 13, 1979 | Danielsson and Ekhoim |
| 1,114,408 | December 15, 1981 | Valo |
| U. S. Pat. No. | | |
| 2,751,781 | June 26, 1956 | McConnell |
| 3,112,021 | November, 1961 | Forsberg |
| 3,584,726 | June 15, 1971 | Hartzell |
| 4,624,361 | November 25, 1986 | Hollins |

Ideally, a log handling apparatus capable of handling a group of straight and crooked logs of various diameters, lengths and orientations, and single feeding them in an aligned manner to a log processing apparatus should be able to run without interruption and be capable of feeding the logs to the log processing apparatus so that the logs are virtually end to end with one another, thereby minimizing waste space between the ends of each log. In this way, a maximum number of logs are processed in a given time. However, in practice, apparatus designed for this purpose are prone to breakdown, are unduly complex, or do not carry out the job of separating the logs individually and feeding them one at a time without frequent interruptions. Thus, it is not uncommon for the apparatus to fail to make a separation between individual logs and thus, the operator must stop the machine, separate the plurality of logs and ensure that they are fed one at a time to the log processing apparatus. Interruptions of this sort are costly and labour intensive.

Of the devices disclosed and claimed in the references listed, two devices in particular are purported to be capable of selecting a log from a group of logs and feeding the log to a log processing apparatus. Canadian Pat. No. 789,368, Ahlstedt, discloses an apparatus for the selection and sidewise delivery of selected sets of long rollable objects of varying diameters from a closely spaced group of such objects, such as logs. In Ahlstedt's apparatus, a lift arm holds back the logs while in the "up" position, and releases one log while it is in the "down" position. At the same time, a second log is allowed to lodge in a pocket to hold back remaining logs. While the Ahlstedt apparatus would appear to deal adequately with logs of relatively uniform diameter, it would appear to be unreliable in dealing with logs of small diameter mixed with logs of large diameter. Lodging of a small log in the retaining pocket would increase the likelihood that a following larger diameter log would be pushed over the smaller log and hence disrupt operation.

Canadian Pat. No. 1,114,408, Valo, discloses and claims an apparatus which is designed specifically for the purpose of handling logs of varying diameter and feeding them one at a time to a log processing apparatus. However, the apparatus disclosed is relatively complex, expensive, and in practice has been found to be prone to breakdown due to its complexity. The apparatus utilizes a dual disc arrangement for separating the logs. The two discs rotate on separate shafts in opposite direction and are provided with peripheral notches which, in the extreme positions of the rotary movement of the discs, are directed substantially toward the log inlet end and the log outlet side. In practice, it has been found that the Valo apparatus cannot be operated efficiently at high speed without frequent breakdown.

The single log sorter that is disclosed and claimed in U.S. Pat. No. 4,624,361, Hollins, discloses and protects a single log feeder which is constructed of a means for receiving and holding a plurality of logs of varying diameter and length arranged parallel and abutting one another in a row, and a separate means for separating and raising the foremost log in the row from the secondarily disposed log in the row and dispensing the foremost log from the apparatus. By nature, not all logs are of the same diameter. They are also not perfectly cylindrical. The logs taper from one end to the other. Further, the logs are not necessarily straight, but are often bent or crooked, and have minor projections around the periphery of the log such as stumps of branches, and the like. As a consequence, the logs do not necessarily roll evenly and consistently down the log runway of the single log feeder. Jamming of logs occurs from time to time and as a consequence an operator must use a log pole or the like to free up the jammed logs so that they can continue to roll down the runway until they are disposed adjacent one another in parallel orientation on the runway.

SUMMARY OF THE INVENTION

The invention is directed to an improvement which serves the purpose of agitating the logs on the runway each time the lifting arms travel to the top of their path of travel. This repeated action, each time the lifting arms reach the top of their path of travel, serves to briefly jar or bump the logs upwardly, which in turn tends to eliminate the cause for jamming of one log adjacent to another log. Thus, with the improved lifting arms, and the built-in agitation feature, logs rolling down the runway tend to move smoothly and thus require minimum intervention by an operator, thereby reducing the level of labour input required to operate the improved single log feeder.

An apparatus for individually sorting and separating a plurality of generally cylindrical objects of the same or varying diameter and length comprising: (a) inclined receiving means including an incline receiving face which receives the cylindrical objects by having the cylindrical objects roll laterally onto the upper end of the inclined receiving face, the inclined receiving means having at its lower end a restraining means including a restraining face which extends at an angle to the receiving face and which hold the cylindrical objects in parallel and abutting relationship with one another at the lower end of the inclined receiving face and upwardly along the inclined receiving face; and (b) cylindrical object separating and raising means associated with the inclined receiving means for separating and raising the foremost cylindrical object abutting the restraining means from the secondarily disposed cylindrical objects on the inclined receiving face and dispensing the foremost cylindrical object from the apparatus in a direction away from the direction in which the cylindrical objects are received by the inclined receiving means, the separating and raising means including an arm pivoted at a location upstream relative to the restraining face to reciprocate upwardly and downwardly between a lower position and an upper position relative to the inclined receiving face, said arm including an upstream portion and a lifting portion underlying the inclined receiving face when in a lower position, and the upstream portion and the lifting portion being positioned at two levels above at least a portion of the inclined receiving face when in an upper position such that the lifting portion is engageable with the foremost cylindrical object to lift it above the restraining face, and the upstream portion lifts at least one of the secondarily disposed cylindrical objects above the inclined receiving face, said arm further including a separating portion adjacent an upstream end of said lifting portion and being engageable with a secondarily disposed cylindrical object to separate it from the foremost object as the latter is lifted by said lifting portion, said separating portion being moveable upstream relative to said restaining face during upward movement of said arm.

DRAWINGS

In the drawings, which represent a specific embodiment of the improved log feeder, but which should not be construed as limiting the scope of the invention in any way.

DETAILED DESCRIPTION OF ONE EMBODIMENT OF THE INVENTION

Figure 1:
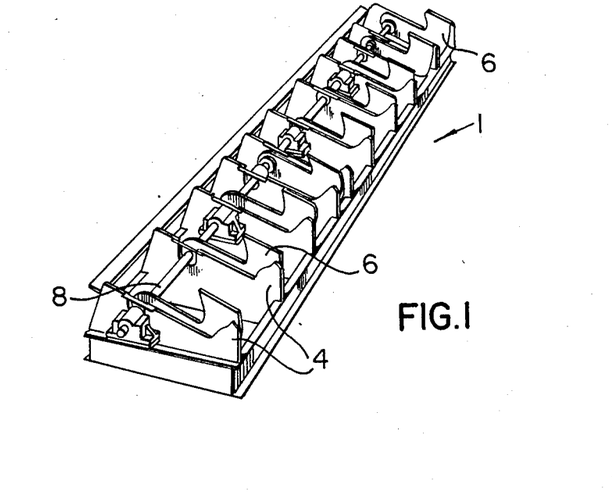
FIG. 1 depicts a perspective view of the improved single log feeder.

Referring to FIG. 1, which represents a perspective view of the single log feeder, the single log feeder 1 is constructed of a linear series of laterally extending alternating skid plates 4 and lift arms 6. The series of skid plates 4 remains stationary, while the series of lift arms 6 are arranged to be raised or lowered, as required, about a common pivot shaft 8, which extends through the skid plates 4 and lift arms 6. The skid plates 4 and lift arms 6 are grouped in pairs. The number of skid plates 4 and lift arms 6 can be varied as required to accommodate the dimensions of all log handling mills, and various lengths of logs. Moreover, the spacing between the respective skid plates 4 lift arm 6 combinations need not be uniform. Thus, the spacing between the respective pairs of skid plates 4 and lift arms 6 may be varied in order to accommodate and fit with existing log handling equipment as installed in the log handling mill. The governing factor is that the spaces between the respective pairs of skid plates 4 and lift arms 6 should be less than the length of the logs being handled so that the logs do not drop between the respective pairs of skid plates 4 and lift arms 6. It is also not mandatory that the skid plates 4 and lift arms 6 alternate. In certain circumstances, it may be useful to have two lift arms 6 between two plates 4.

Figure 2:
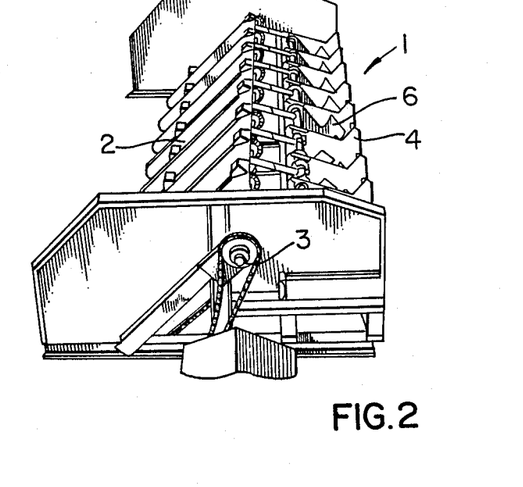
FIG. 2 represents a perspective view of the single log feeder in combination with a log unscrambler.

FIG. 2 illustrates a perspective view of the single log feeder 1 in combination with a log unscrambler 2 which carries logs upwardly on an inclined runway to the top of the skid plates 4 of the single log feeder 1.

Figure 3:
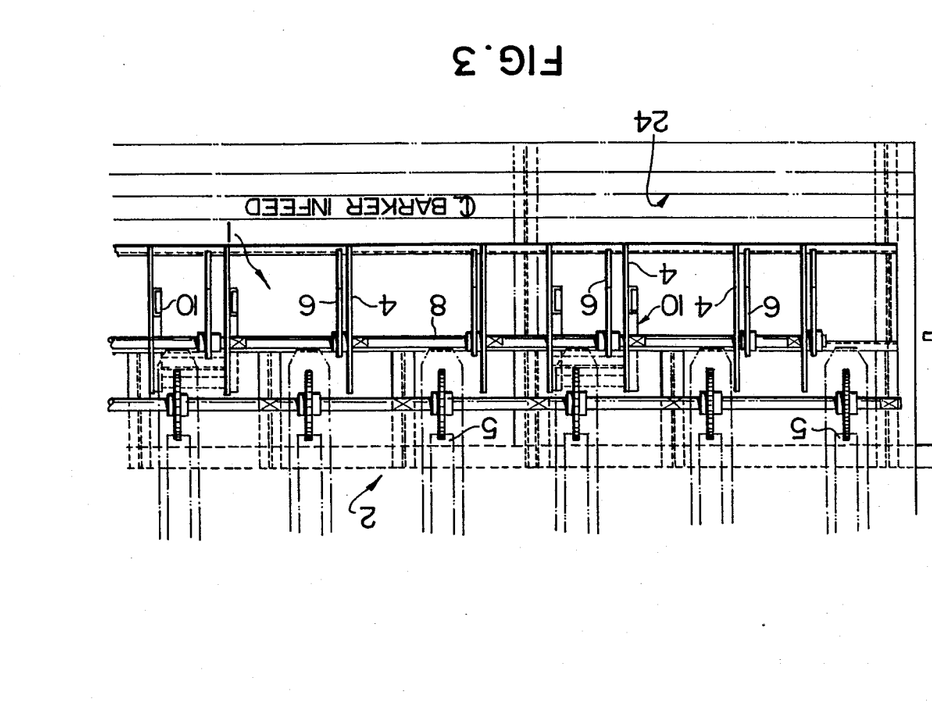
FIG. 3 illustrates a plan view of the log unscrambler-single log feeder combination arranged to feed logs to a log barker.

FIG. 3 represents a plan view of the single log feeder 1 in combination with the log unscrambler 2 on the upstream side and a barker infeed 24 on the downstream side. The log unscrambler 2 is a conventional piece of apparatus and is well known in the log handling art. The unscrambler does not represent part of the applicant's invention but is described and illustrated for completeness of disclosure. The unscrambler 2 consists of a series of parallel log conveying teeth and chains, 5 or the like, which move and raise the logs in an inclined upwardly manner in the direction of the arrow (see also FIG. 2). FIG. 3 illustrates in detail the manner in which a plurality of skid plates 4 and lift arms 6 in pairs, are arranged parallel to one another in a linear series lateral to the direction of flow of the logs. The skid plates 4 alternate respectively with accompanying lift arms 6 and extend in the same direction as the direction of movement of the unscrambler 2. A long pivot shaft 8 extends at right angles through the plurality of parallel pairs of skid plates 4 and lift arms 6. The shaft 8 pivots freely relative to the skid plates 4. However, the plurality of lift arms 6 are affixed to the shaft 8 and are mounted by suitable securing means at respective points along the length of the pivot shaft 8. The pivot shaft 8 is journalled for rotation within suitable supporting bearing means. Since each lift arm 6 is firmly secured at its point of connection to the pivot shaft 8, and the pivot shaft 8 is free to rotate within the bearing means, the plurality of lift arms 6 can be moved in unison and alternately between a lower position and an upper position by rotating the pivot shaft 8. FIG. 3 also illustrates a plurality of cylinder mounts 10 which are adapted to receive respective hydraulic or pneumatic piston-cylinder mechanisms (not shown) which are used to raise or lower the lift arms 6. FIG. 3 further illustrates on the side opposite the unscrambler 2 the infeed 24 of an appropriate log handling apparatus such as a log barker or log chip and saw apparatus. The infeed 24 as depicted in FIG. 3 travels in the direction of the arrows and receives logs deposited thereon in end to end relationship by the lift arms 6. In practice the infeed can travel in either direction.

Figure 4:
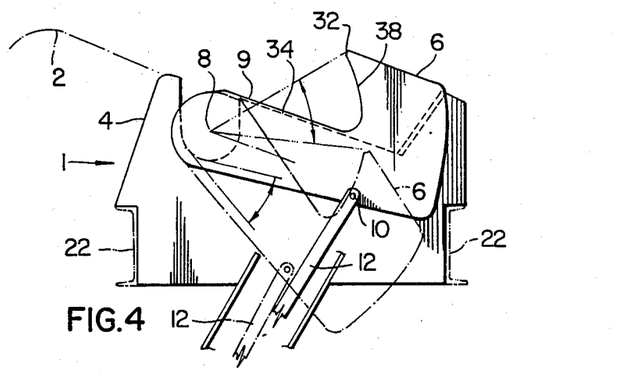
FIG. 4 represents a side elevation view of the improved single log feeder and improved lifting arm.

FIG. 4 represents a side elevation view of the improved single log feeder 1 in combination with a dotted line representation of the unscrambler 2. FIG. 4 illustrates in detail the manner in which the lift arm 6 moves between a lower and an upper position relative to skid plate 4. The lift arm 6 depicted in solid line indicates the upper position of the lift arm 6. In the lower position, the lift arm 6 is shown in dotted lines. As discussed previously, the lift arm 6 is affixed to pivot shaft 8. A hydraulic or pneumatic cylinder-piston means 12, which is mounted on cylinder mount 10, moves the lift arm 6 between a lower position and an upper position. FIG. 4 also illustrates the basic frame 22 of the single log feeder 1. The frame 22 is of sufficiently strong construction to support the weight of the plurality of lift arms 6, skid plates 4, shaft 8, cylinders 12 and the weight of logs rolling down the upper faces of the skid plates 4.

The key improvement in the design of the lift arm 6, as seen in FIG. 4, compared to the design of the lift arm that is disclosed and claimed in U.S. Pat. No. 4,624,361 is that the upper surface of the lift arm 6, between pivot 8 and the pocket formed by arc 38, is raised so that in the upper position, upper surface 9 comes to a stop above the elevation of initial skid face 34. Thus, when the arm 6 is raised from its lower position to its upper position, upper surface 9 abruptly raises the logs following the log being dispensed a certain distance above skid face 34. Since arm 6 reciprocates rather rapidly between its lower position and its upper position, and since upper surface 9 comes to a stop above the elevation of skid face 34, the logs that run down skid face 34 and come to a rest against separator point 32 are given an upward "bump". This bumping action, which occurs at the top of each cycle of the lift arm 6, and at each stage that one or more secondary logs roll into place down the skid surface 34, ensures that uneven, crooked or jammed logs, will separate and thus the secondary log(s) will invariably roll into position in the pocket formed by arc 38. Thus, the need for an operator to attend the single log feeder and separate jammed logs to ensure that the secondary logs slide or roll down the skid surface 34 is eliminated.

Figure 5:
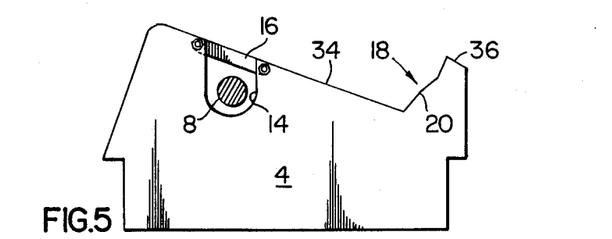
FIG. 5 depicts a side elevation view of a log skid plate.
Figure 5A:
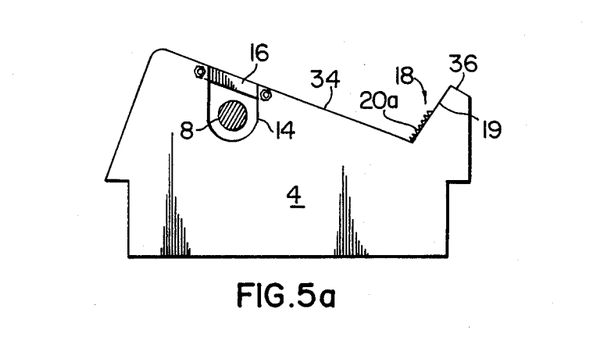

FIG. 5 represents a detailed side elevation view of the construction of the skid plate 4. The skid plate 4 has constructed therein a shaft recess 14, which permits the pivot shaft 8 to extend laterally without interference through the skid plate 4. A skid bar 16 is bolted or welded in place to bridge the upper part of the shaft recess 14. This bar 16 permits logs to roll downwardly without interference along the upper edge of skid plate 4. The long initial skid face of skid plate 4 is identified as 34 in FIG. 5. The skid plate 4 also has a short terminal skid face 36, as seen in FIG. 5. The upper portion of the skid plate 4 has a contoured pocket 18 constructed between the initial skid face 34 and the terminal skid face 36. It should be understood that pocket 18 can be a straight face seen as face A in FIG. 5a, if a contour is not desired. Also, Coleman teeth 20a can be affixed to straight face 19, as seen in FIG. 5a, to increase log gripping action. Located within the overall contoured pocket 18 is a small log abutment face 20, both of which are constructed to accommodate the diameter of the sizes of logs which are to be typically handled by the single log feeder 1. The range of diameter, for example, 2 ¼" to 10", 3 ¼" to 12", 4" to 16", 5" to 22", 8" to 32", 6"to 42", etc., while depending on the size of the machine, all work on the same principle. The single log feeder 1 is typically constructed to accommodate logs with diameters ranging from 4 inches to 16 inches. However, as can be readily recognized, the dimensions of the skid plate 4 can be increased in order to accommodate logs of larger diameter. Bearings for the feeder 2 are mounted on a flat plate and gussetted to the side of the skid plate. If need be, for extra load carying capacity, intermediate bearings supporting shaft 8 can be installed.

Figure 6:
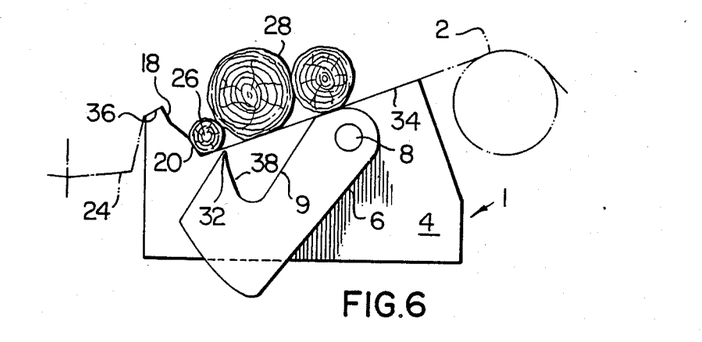
FIGS. 6, 7 and 8, in sequence, represent side elevation views illustrating the manner in which the improved single log feeder receives logs of varying diameter from a log unscrambler, separates them, agitates them on each cycle of the lifting arm, and feeds them one at a time to a log processing apparatus.
Figure 7:
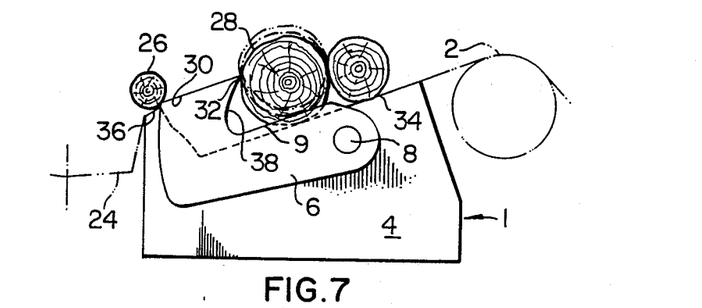
Figure 8:
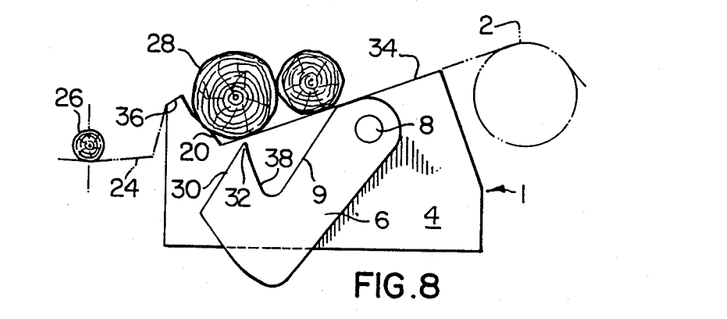

FIGS. 6, 7 and 8 in sequence illustrate the manner in which the single log feeder 1 separates a small log 26 from a group of logs including a following large log 28 and delivers the small log 26 to the infeed 24 of a typical barker apparatus or chip and saw apparatus. In FIG. 6, the lift arm 6 is shown in its lower position. The small log 26 and the large log 28 rest side-by-side in parallel orientation on the downwardly inclined initial skid face 34. The logs 26 and 28 and other logs have been deposited on skid surface 34 by unscrambler 2. The unscrambler 2 may not be required if the logs are single layered on a transfer deck. The small log 26 abuts the small log abutment face 20. If required, as seen in FIG. 5a, hardened teeth (Coleman inserts) can be added to abutment face 20 to provide gripping action and keep small logs from being displaced when another log rolls down and hits the first log. The purpose of the small log abutment face 20 is to hold the small log 26 partially upwardly and to the right (as seen in FIG. 6) along the inclined initial skid face 34. If the small log abutment face 20 were not present, the small log 26 would rest at the base of the contoured pocket 18, the large log 28 would be permitted to advance further down the inclined initial skid face 34 (to the left, as seen in FIG. 6) and hence when the lift arm 6 is raised, there would be a good possibility that both the small log 26 and large log 28 would be raised upwardly and dumped onto the infeed 24. This would not be acceptable since it is important that only a single log be put on the infeed 24 at a time. More than one log would create problems for the log processing apparatus. If both logs 26 and 28 were dropped on the infeed 24, the operator must stop the single log feeder 1 for a short period of time while the two logs are separated and fed individually in linear series on the infeed 24.

As seen in FIG. 7, when improved lift arm 6 is in an elevated position, the upper surface 9 lifts log 28 above the elevation of the skid face 34. This causes log 28 to move abruptly relative to the next log on the skid face 34 and tends to free any jamming or hooking that might exist between the adjacent logs. In the case of small logs, the upper surface 9 as it reaches the top of its travel, will "bump" one or more logs resting on the skid face 34. Thus, each time the arm 6 reciprocates to its top position, it agitates the logs that are behind the log being dispensed and repeatedly ensures that the logs do not become jammed or locked with one another.

As also seen in FIG. 7, when the lift arm 6 is in a raised position, its upper skid face 30 aligns more or less with terminal skid face 36 of skid plate 4. As lift arm 6 moves upwardly, its log separator point 32 separates the small log 26 from the large log 28. The face 30 lifts the small log 26 upwardly, while at the same time the point 32 moves large log 28 upwardly and rearwardly along the intial skid face 34. Small log 26 then rolls along skid face 30 of lift arm 6, over terminal skid face 36, and onto the infeed 24, as can be seen in FIG. 8.

Meanwhile, as demonstrated in FIG. 8, the lift arm 6 returns to its lower position, thereby permitting large log 28 to roll downwardly along the initial skid face 34, so that it comes to rest against contour pocket 18. However, as FIG. 8 illustrates, when a large log 28 is involved, large log 28 is not held back, if at all, by small log abutment face 20. Thus, large log 28 can rest farther down the inclined surface of initial skid face 34. When lift arm 6 is again raised, separator point 32 moves upwardly behind the centre of gravity of large log 28, and ahead of the log which follows the large log 28, and thereby separates the two logs. As the lift arm 6 moves upwardly, it raises large log 28 upwardly so that it can ultimately roll over terminal skid face 36 and onto the infeed 24.

As can also be seen in FIGS. 6, 7 and 8, the lift arm 6 is constructed to have therein a pocket in the shape of an arc 38, which serves the purpose of holding back small logs. When large logs are involved, such as the large log 28 shown in FIG. 7, the log is held back by separator point 32. However, if a small log is first in line, it rests against arc 38. The contour of arc 38 is designed so that as lift arm 6 moves downwardly, the arc 38 tends to move away from the log which it is holding. It has been found that when arc 38 has a radius which is coincident with the axis of pivot shaft 8, arc 38 tends to bind against the log as lift arm 6 is being lowered. Thus, to prevent binding, it is advantageous to have the pivot point of the radius of arc 38 at a location above the axis of pivot shaft 8. In this way, the arc 38 tends to move slightly away from the log being held by the arc 38 as lift arm 6 is lowered.

It has been found that the single log feeder 1, in operation, with improved lift arm 6, is very reliable, sturdy, not prone to breakdown, log jam free and can be operated at high rates of speed. All components making up the construction of the single log feeder 1 are of rugged construction, and require virtually no maintenance.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. An apparatus for individually sorting and separating a plurality of generally cylindrical objects of the same or varying diameter and length comprising:
   (a) inclined receiving means including an inclined receiving face which receives the cylindrical objects by having the cylindrical objects roll laterally onto the upper end of the inclined receiving face, the inclined receiving means having at its lower end a restraining means including a restraining face which extends at an angle to the receiving face and which holds the cylindrical objects in parallel and abutting relationship with one another at the lower end of the inclined receiving face and upwardly along the inclined receiving face; and
   (b) cylindrical object separting and raising means associated with the inclined receiving means for separating and raising the foremost cylindrical object abutting the restraining means abutting cylindrical object from the secondarily disposed cylindrical objects on the inclined receiving face and dispensing the foremost cylindrical object from the apparatus in a direction away from the direction in which the cylindrical objects are received by the inclined receiving means, the separating and raising means including an arm pivoted at a location upstream relative to the restraining face to reciprocate upwardly and downwardly between a lower position and an upper position relative to the inclined receiving face, said arm including an upstream portion and a lifting portion underlying the inclined receiving face when in a lower position, and the upstream portion and the lifting portion being positioned at two different levels above at least a portion of the inclined receiving face when in an upper position such that the lifting portion is engageable with the foremost cylindrical object to lift it above the restraining face, and the upstream portion lifts at least one of the secondarily disposed cylindrical objects above the inclined receiving face, said arm further including a separating portion adjacent an upstream end of said lifting portion and being engageable with a secondarily disposed cylindrical object to separate it from the foremost object as the latter is lifted by said lifting portion, said separating portion being moveable upstream relative to said restraining face during upward movement of said arm.

2. An apparatus according to claim 1 wherein the restraining means is constructed in the form of a contoured pocket which is positioned at the lower end of the inclined receiving face, the inclined receiving face forming one side of the pocket, and the other side of the pocket being formed by the restraining face which angles upwardly and away from the lower portion of inclined receiving face.

3. An apparatus according to claim 2 wherein the restraining face of the contoured pocket has constructed therein at its base a protruding abutment face which extends upwardly along a portion of the restraining face and serves to hold cylindrical objects of small diameter at a position higher up the inclined receiving face of the receiving means than a cylindrical object of a larger diameter.

4. An apparatus according to claim 2 wherein the lifting portion of the arm has thereon an upwardly facing face which, when the arm is in a upper position, aligns generally with the top of the restraining face.

5. An apparatus according to claim 1 wherein the separating portion of the arm includes a protrusion serving to extend between and separate the foremost and the secondarily disposed cylindrical objects on the inclined receiving face as the arm is raised.

6. An apparatus according to claim 5 wherein the protrusion tends to move away from the secondarily disposed cylindrical object as the arm is returned to its lower position.

7. An apparatus according to claim 4 wherein the arm is constructed so that at least a portion of the face of the lifting portion, when in an upper position, is of a higher elevation than the remainder of the arm.

8. An apparatus according to claim 1 wheren said arm includes a portion defining a pocket for receiving secondarily positioned objects as the arm is raised above the receiving face, the portion defining the pocket being movable upstream relative to the restraining face during upward movement of the arm.

9. An apparatus according to claim 1 wherein the lifting portion has an effective lifting area which is movable above the receiving face and increases as the lifting portion is raised bove the receiving face.

10. An apparatus according to claim 2 wherein said pocket has a straight side and the restraining face has teeth constructed in the face.

11. An apparatus according to claim 1 wherein the upstream portion of the arm is of a lower elevation than the lifting portion of the arm, and the upstream portion of the lifting arm is substantially parallel to at least a portion of the inclined receiving face and is positioned at an elevation above the inclined receiving face when the arm is in its upper position.

12. Apparatus for individually handling and lifting a plurality of generally cylindrical objects of the same or varying diameter and length, the apparatus comprising in combination:

(a) inclined receiving means including an inclined receiving face which receives the cylindrical objects by having the cylindrical objects roll laterally onto the upper end of the inclined receiving face, the inclined receiving means having at its lower end a restraining means including a restraining face which extends at an angle to the receiving face and which holds the cylindrical objects in parallel and abutting relationship to one another at the lower end of the inclined receiving face and upwardly along the inclined receiving face with the foremost cylindrical object abutting against the restraining face; and (b) cylindrical object separating and raising means associated with the inclined receiving means for separating and raising the foremost cylindrical object abutting against the restraining face from the secondarily disposed cylindrical object on the receiving face and dispensing the foremost cylindrical object from the apparatus in a direction away from the direction in which the cylindrical objects are received by the inclined receiving means, the separating and raising means being reciprocatable upwardly and downwardly between a lower position and an upper position relative to the receiving face and including an upstream portion and a lifting portion movable and arranged relative to the receiving face such that the lifting portion is engageable with the foremost cylindrical object to lift it above the restraining face and the upstream portion lifts at least the secondarily disposed cylindrical object above the inclined receiving face when the separating and raising means moves towards its upper position, said separating and raising means further including a separating portion located adjacent an upstream end of said lifting portion and being engageable with a secondarily disposed cylindrical object to separate it from the foremost cylindrical object as the latter is lifted by the lifting portion, the separating portion being movable upstream relative to the restraining face during upward movement thereof, and wherein the lifting portion has an effective lifting area which is movable above the receiving face and increases as the lifting portion is raised above the receiving face.

* * * * *

UNITED STATES PATENT AND TRADEMARK OFFICE
CERTIFICATE OF CORRECTION

PATENT NO. : 4,911,283

DATED : March 27, 1990

INVENTOR(S) : Bryant C. Hollins

It is certified that error appears in the above-identified patent and that said Letters Patent is hereby corrected as shown below:

In claim 1, column 8, line 5, please delete "separting" and substitute therefor --separating--.

In claim 8, column 9, line 3, please delete "wheren" and substitute therefor --wherein--.

In claim 9, column 9, line 12, please delete "bove" and substitute therefor --above--.

Signed and Sealed this

Fourteenth Day of July, 1992

Attest:

DOUGLAS B. COMER

Attesting Officer

Acting Commissioner of Patents and Trademarks